United States Patent
Nageshkar et al.

(10) Patent No.: US 10,821,863 B1
(45) Date of Patent: Nov. 3, 2020

(54) RETENTION MEMBER FOR VEHICLE SEATING ASSEMBLY

(71) Applicant: Ford Global Technologies, LLC, Dearborn, MI (US)

(72) Inventors: Vishal Vinayak Nageshkar, Farmington Hills, MI (US); John W. Jaranson, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/450,286

(22) Filed: Jun. 24, 2019

(51) Int. Cl.
| | |
|---|---|
| B60N 2/42 | (2006.01) |
| B60N 2/427 | (2006.01) |
| B60N 2/50 | (2006.01) |
| B60N 2/68 | (2006.01) |
| B60N 2/58 | (2006.01) |

(52) U.S. Cl.
CPC .............. B60N 2/58 (2013.01); B60N 2/68 (2013.01)

(58) Field of Classification Search
CPC ................... B60N 2/58; B60N 2/68
USPC ............ 297/216.1, 216.13, 216.14, 452.56, 297/452.63, 284.11
See application file for complete search history.

(56) References Cited

U.S. PATENT DOCUMENTS

| | | | | |
|---|---|---|---|---|
| 3,088,773 A | * | 5/1963 | Horrocks ............... | A47C 7/282 297/452.63 X |
| 3,131,971 A | * | 5/1964 | Gunn ..................... | A47C 5/04 297/452.19 X |
| 4,359,200 A | * | 11/1982 | Brevard ................. | B64D 25/06 297/216.1 X |
| 5,558,399 A | * | 9/1996 | Serber .................. | B60N 2/4221 297/216.1 |
| 5,810,392 A | * | 9/1998 | Gagnon ................ | B60N 2/002 180/268 |
| 5,865,463 A | * | 2/1999 | Gagnon ................ | B60N 2/002 280/730.2 |
| 5,895,090 A | * | 4/1999 | Farquhar ............. | B60N 2/0715 297/216.1 |

(Continued)

FOREIGN PATENT DOCUMENTS

| | | |
|---|---|---|
| CN | 201890166 U | 7/2011 |
| EP | 2123507 A1 | 11/2009 |
| JP | 2011157049 A | 8/2011 |

OTHER PUBLICATIONS

Commonly assigned co-pending U.S. Appl. No. 16/166,910, filed Oct. 22, 2018, including filing receipt, application and drawings.

Primary Examiner — Rodney B White
(74) Attorney, Agent, or Firm — David Coppiellie; Price Heneveld LLP

(57) ABSTRACT

A foamless vehicle seating assembly includes a frame with an inner support member and an outer support member. A first plurality of flexible straps extend about the inner support member of the frame, and a second plurality of flexible straps extend about the outer support member of the frame. At least one strap of the second plurality of flexible straps of the outer support member is adjacent to at least one strap of the first plurality of flexible straps of the inner support member. A retention member is disposed transverse to the inner support member of the frame disposed in a seat, wherein the retention member is displaceable between a design position and a fully deployed position in response to a sudden vehicle deceleration.

20 Claims, 18 Drawing Sheets

(56) References Cited

U.S. PATENT DOCUMENTS

| | | | | |
|---|---|---|---|---|
| 5,971,432 | A * | 10/1999 | Gagnon | B60N 2/002 180/268 |
| 6,050,629 | A * | 4/2000 | Bernhardt | B60N 2/0715 296/65.01 |
| 6,450,573 | B1 * | 9/2002 | Yamaguchi | B60N 2/4221 297/216.1 |
| 6,648,409 | B1 * | 11/2003 | Laporte | B60N 2/4221 297/216.1 |
| 6,746,077 | B2 * | 6/2004 | Klukowski | B60N 2/42763 297/216.1 |
| 6,837,540 | B2 * | 1/2005 | Yamaguchi | B60N 2/4221 297/216.1 |
| 6,908,149 | B1 * | 6/2005 | Yamaguchi | B60N 2/4221 297/216.1 |
| 6,921,133 | B2 | 7/2005 | Taoka et al. | |
| 7,144,042 | B2 * | 12/2006 | Eichwald | B60R 22/28 297/470 X |
| 7,168,742 | B2 * | 1/2007 | Tomita | B60R 22/023 297/480 X |
| 7,192,087 | B2 * | 3/2007 | Adragna | B60N 2/62 297/216.1 |
| 7,404,602 | B2 * | 7/2008 | Okada | B60N 2/0284 297/216.1 |
| 7,669,935 | B2 | 3/2010 | Crossley et al. | |
| 7,784,831 | B2 * | 8/2010 | Dong | B60R 22/28 297/471 X |
| 7,997,620 | B1 * | 8/2011 | Dong | B60R 22/03 297/472 X |
| 8,091,923 | B2 * | 1/2012 | Dong | B60R 22/28 297/472 X |
| 8,272,687 | B2 * | 9/2012 | Gross | B60N 2/42718 297/216.1 |
| 8,297,697 | B2 * | 10/2012 | Gross | B60N 2/42718 297/216.1 |
| 8,308,235 | B2 | 11/2012 | Ellison et al. | |
| 8,393,681 | B2 * | 3/2013 | Gross | B60N 2/42763 297/216.1 X |
| 8,517,328 | B2 * | 8/2013 | Wieclawski | B60N 2/0705 248/429 |
| 8,746,792 | B2 * | 6/2014 | Ruthinowski | B60N 2/4263 297/216.1 |
| 9,199,560 | B2 | 12/2015 | Line et al. | |
| 2002/0003365 | A1 * | 1/2002 | Yamaguchi | B60N 2/42763 297/216.1 |
| 2002/0053793 | A1 * | 5/2002 | Yamaguchi | B60N 2/42763 297/216.1 X |
| 2003/0137180 | A1 * | 7/2003 | Rouhana | B60R 22/26 297/484 |
| 2005/0046267 | A1 * | 3/2005 | Becker | B60R 22/023 297/483 |
| 2005/0242634 | A1 * | 11/2005 | Serber | B60N 2/0745 297/216.1 |
| 2006/0055214 | A1 * | 3/2006 | Serber | B60N 2/1846 297/216.1 |
| 2010/0109395 | A1 * | 5/2010 | Ruthinowski | F16F 1/32 297/216.11 |
| 2016/0016492 | A1 * | 1/2016 | Subramanian | B60N 2/42763 297/216.1 |
| 2016/0368404 | A1 * | 12/2016 | Sammons | B60N 2/7047 |
| 2018/0079328 | A1 * | 3/2018 | Ueguri | B60N 2/995 |
| 2020/0198505 | A1 * | 6/2020 | Schoenbach | B60N 2/067 |

* cited by examiner

RETENTION MEMBER FOR VEHICLE SEATING ASSEMBLY

FIELD OF THE DISCLOSURE

The present disclosure generally relates to a vehicle seating assembly, and more specifically to a vehicle seating assembly designed to regulate the position of a seating assembly occupant during a sudden vehicle deceleration.

BACKGROUND OF THE DISCLOSURE

A vehicle seating assembly may have features that manage the position of an occupant on a vehicle seat.

SUMMARY OF THE DISCLOSURE

According to one aspect of the present disclosure, a foamless vehicle seating assembly includes a frame with an inner support member and an outer support member. A first plurality of flexible straps extend about the inner support member of the frame, and a second plurality of flexible straps extend about the outer support member of the frame. At least one strap of the second plurality of flexible straps of the outer support member is adjacent to at least one strap of the first plurality of flexible straps of the inner support member. A retention member is disposed transverse to the inner support member of the frame disposed in a seat, wherein the retention member is displaceable between a design position and a fully deployed position in response to a sudden vehicle deceleration.

Embodiments of the first aspect of the disclosure can include any one or a combination of the following features:
  the retention member is disposed between a primary portion of the seat and a secondary portion of the seat;
  the primary portion of the seat is disposed between the retention member and a front edge of the seat;
  the secondary portion of the seat is disposed between the retention member and a bite line;
  the first plurality of flexible straps in the primary portion of the seat are less flexible than the first plurality of flexible straps in the secondary portion of the seat;
  the first plurality of flexible straps in the primary portion of the seat are less elastic than the first plurality of flexible straps in the secondary portion of the seat;
  the first plurality of flexible straps in the primary portion of the seat are stiffer than the first plurality of flexible straps in the secondary portion the seat;
  the retention member includes a retention strap disposed above the first plurality of flexible straps;
  the retention member includes a retention strap disposed below the first plurality of flexible straps;
  the inner support member is disposed at each side of a seat, and the outer support member is disposed at outermost sides of seat side bolsters;
  wherein the retention member includes a retention strap fixed to the inner support member disposed at each side of the seat;
  the retention member includes a retention strap fixed to the outer support member disposed at outermost sides of seat side bolsters;
  the retention strap is slidably coupled to the inner support member disposed at each side of the seat; and
  the retention member includes an elongated member of a load limiter assembly.

According to another aspect of the present disclosure, a vehicle seating assembly has a seat including a frame with first and second longitudinal members. A retention member is disposed between the first and second longitudinal members of the frame and is movable between a design position and fully deployed position. A substrate is disposed between the first and second longitudinal members of the frame and includes a first portion disposed between the retention strap and a front edge of the seat and a second portion disposed between the retention strap and a rear edge of the seat, wherein the first portion is less flexible than the second portion.

Embodiments of the second aspect of the disclosure can include any one or a combination of the following features:
  the retention member includes a retention strap fixed to the first and second longitudinal members of the frame;
  the retention member includes an elongated member of a load limiter assembly, wherein the retention assembly is coupled to the frame;
  a design position of the load limiter assembly includes an elongated member disposed at a first angle relative to a vehicle floor, and wherein a fully deployed position of the load limiter assembly includes an elongated member disposed at a second angle relative to a vehicle floor; and
  the retention member includes a retention strap fixed to the first and second longitudinal members of the frame, and wherein the retention member includes an elongated member of a load limiter assembly coupled to the frame.

According to another aspect of the present disclosure, a vehicle seating assembly includes a seat with a frame having first and second longitudinal frame members and a retention member disposed traverse to the first and second longitudinal frame members. A substrate is disposed over the frame and has a primary portion and a secondary portion, wherein the secondary portion extends between the retention member and a bite line of the seating assembly. The secondary portion deforms from a first shape to a second shape in response to a sudden vehicle deceleration.

These and other aspects, objects, and features of the present disclosure will be understood and appreciated by those skilled in the art upon studying the following specification, claims, and appended drawings.

DETAILED DESCRIPTION

Figure 1:
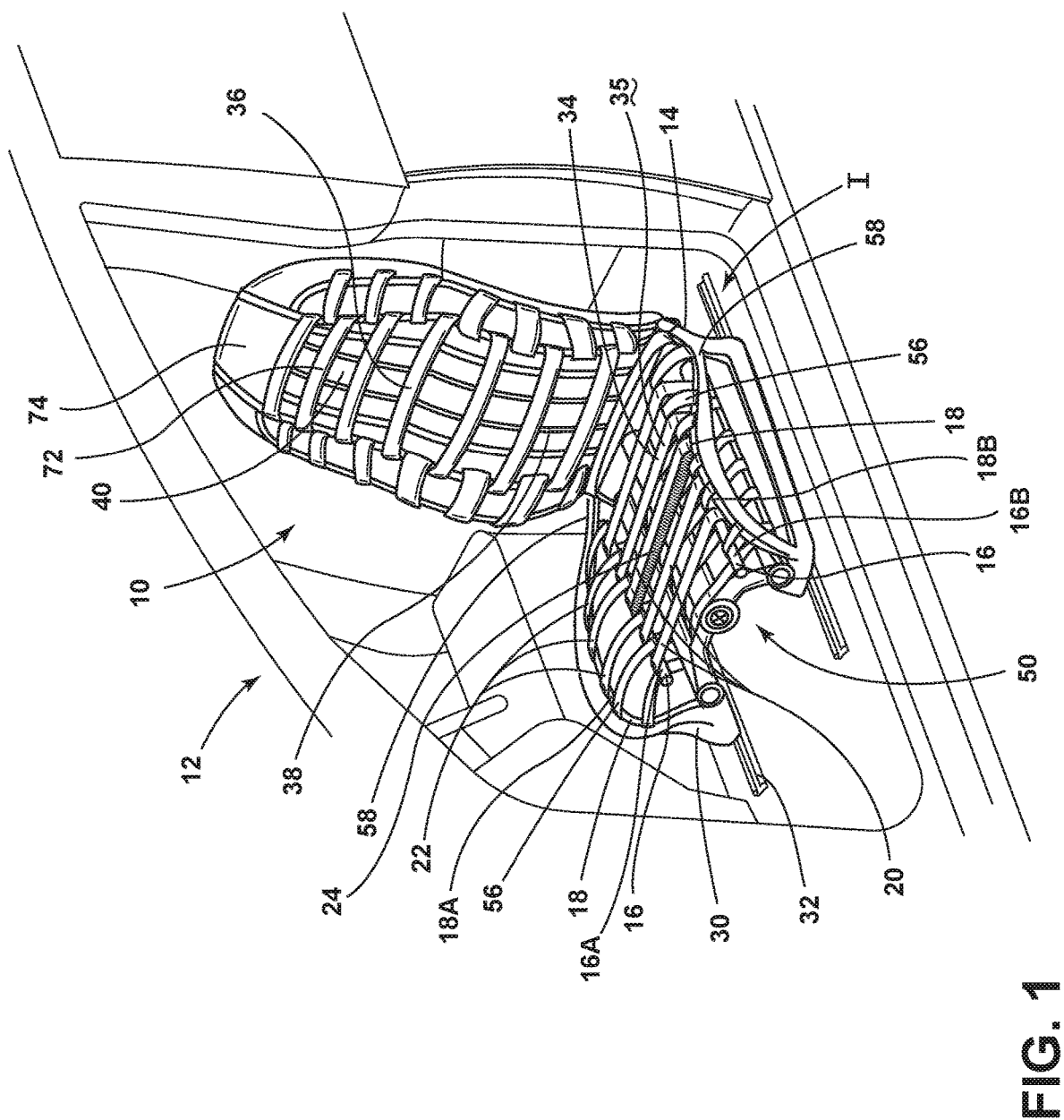
FIG. 1 is a top perspective view of a vehicle seating assembly of the present disclosure, according to an example.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element.

With reference to the seating assembly described below and shown in the attached figures, a seating assembly may be described from the vantage point of an occupant seated in the seating assembly. The side of a seating assembly disposed on a right side of a seated occupant may be referred to as a right side or a first side of the seating assembly. The side of a seating assembly disposed on a left side of a seated occupant may be referred to as a left side or a second side of the seating assembly.

Referring to FIGS. 1-14, reference numeral 10 generally designates a foamless seating assembly for a vehicle 12 that includes a frame 14 having an inner support member 16 and an outer support member 18. A first plurality of flexible straps 20 extends about the inner support member 16 of the frame 14. A second plurality of flexible straps 22 extends about the outer support member 18 of the frame 14. At least one strap of the second plurality of flexible straps 22 of the outer support member 18 is adjacent to at least one strap of the first plurality of flexible straps 20 of the inner support member 16 of the frame 14. A retention member is disposed across the inner support member 16 of the frame 14 disposed in the seat 34. In some examples, the retention member may include a retention strap 24 or an elongated member 132 of a load limiter assembly 130.

Figure 2:
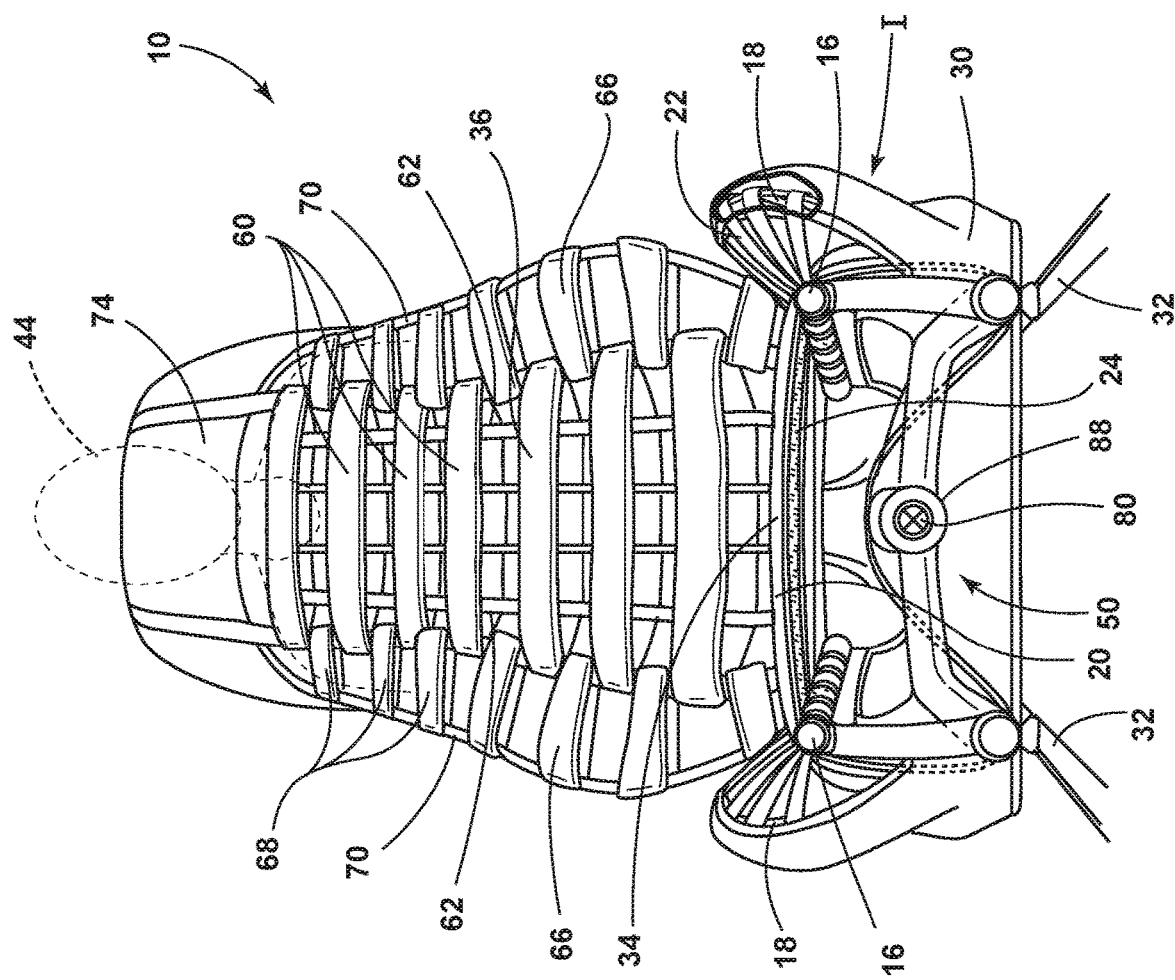
FIG. 2 is a front elevational view of a vehicle seating assembly of the present disclosure.

With reference to FIGS. 1-2, the seating assembly 10 may be used in any vehicle 12, such as a car, a truck, a van, an autonomous vehicle, and other vehicles. It is contemplated that the concept set forth in this disclosure may be utilized in a front or forward position of the vehicle 12, as well as a rear or rearward position of the vehicle 12. The seating assembly 10, as illustrated, may include a seat base 30 that may be positioned on rail slides 32 to allow fore and aft movement of the seating assembly 10 relative to the vehicle 12. A seat 34 may be operably coupled with the seat base 30 and may be movable relative thereto, as set forth in further detail below. In addition, a seatback 36 of the seating assembly 10 may include a central area that may include a lower lumbar region 38 and an upper thoracic region 40, as well as a headrest 74. Each of the components of the seatback 36 may be configured for adjustability to properly support the weight of various occupants 44 inside the vehicle 12.

With reference again to FIGS. 1-2, the seating assembly 10 may be generally configured to operate in a foamless condition. That is, the seat 34 and the seatback 36 of the seating assembly 10 may not include a foam cushion to provide cushion to the back and posterior of an occupant 44. Rather, the first and second plurality of flexible straps 20, 22, which can be tightened or loosened, may be used to provide a seating surface to the user. To accommodate occupants 44 of different sizes and different cushioning preferences, the seating assembly 10 may be configured with a tensioning apparatus 50 that may be configured to apply tension or remove tension from the first and second plurality of flexible straps 20, 22 that extend across the seat 34 and the seatback 36. It will be understood that the tensioning apparatus 50 may be configured to provide tension to the first plurality of flexible straps 20 or the second plurality of flexible straps 22, or adjust the tension in both the first plurality of flexible straps 20 and the second plurality of flexible straps 22 simultaneously. It will also be understood that although the first and second plurality of flexible straps 20, 22 are shown in alternating configuration (with each of the first plurality of flexible straps 20 disposed adjacent to or between each of the second plurality of flexible straps 22), variations to this configuration are also contemplated. Specifically, two or three of the first plurality of flexible straps 20 may be disposed between each of the second plurality of flexible straps 22. Conversely, two or three of the second plurality of flexible straps 22 may be disposed between each of the first plurality of flexible straps 20. In addition, the first and second plurality of flexible straps 20, 22 may include varying thicknesses across the seat 34 or seatback 36.

With reference to FIGS. 1, 1A, 1B, 1C, and 2, the retention member is shown disposed on the seat 34. With reference to FIGS. 1, 1A, 1B, 1C, and 2, the retention member may include a retention strap 24 disposed proximate the first plurality of flexible straps 20 and attached to the inner support member 16 of the frame 14. With reference to FIG. 1D, the retention member may include a retention strap 24 disposed above the first plurality of flexible straps 20 and the second plurality of flexible straps 22, attached to the outer support member 18 of the frame 14, and slidably coupled to the inner support member 16 of the frame 14. FIGS. 1-2 show the seat 34 and the retention strap 24 in the design position I.

Figure 1A:
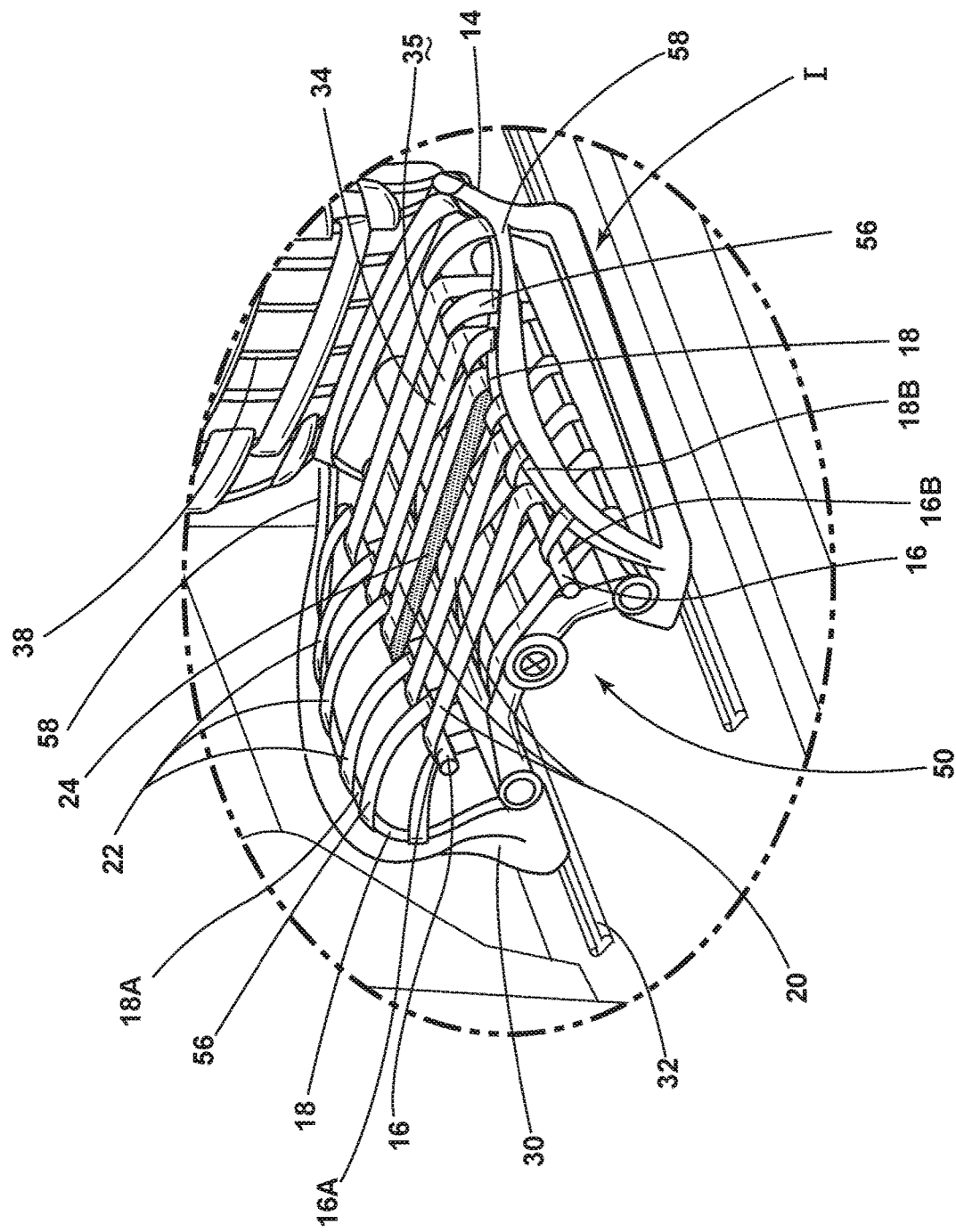
FIG. 1A is a top perspective view of a vehicle seating assembly of the present disclosure with a retention strap disposed above the straps and attached to the inner support member of the frame.

With reference to FIG. 1A, an exploded view of a portion of the seat 34 with the retention strap 24 shown in FIG. 1 is shown. The retention strap 24 is shown disposed above the first plurality of flexible straps 20 and attached to the inner support member 16 of the frame 14. In the example shown in FIG. 1A, the retention strap 24 may be fixed to the inner support member 16 of the frame 14. The inner support member 16 of the frame 14 may include a first longitudinal member 16A and a second longitudinal member 16B. During a sudden vehicle deceleration represented by force F in FIGS. 6 and 8, the retention strap 24 may act as a reaction surface that may restrict forward movement of an occupant 44 along a seat surface 35.

Figure 1B:
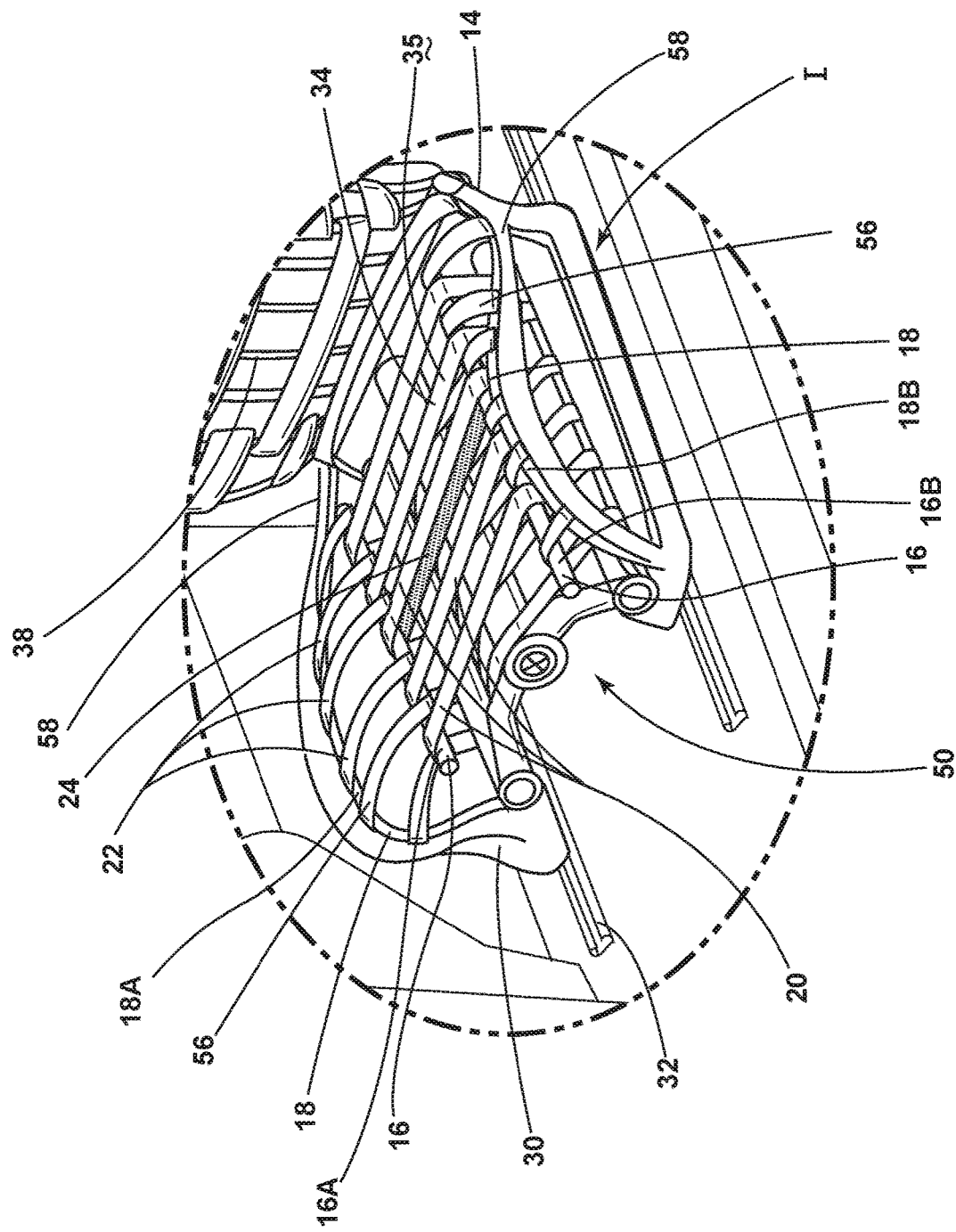
FIG. 1B is a top perspective view of a vehicle seating assembly of the present disclosure with a retention strap disposed below the straps and attached to the inner support member of the frame.

With reference to FIG. 1B, an exploded view of a retention strap 24 disposed below the first plurality of flexible straps 20 and attached to the inner support member 16 of the frame 14 is shown. In the example shown in FIG. 1B, the retention strap 24 may be fixed to the first longitudinal member 16A and the second longitudinal member 16B of the inner support member 16 of the frame 14. In the example shown, it is contemplated that a retention strap 24 may be disposed below the first plurality of flexible straps 20, may be fixed to the inner support member 16, and may be disposed proximate the first plurality of flexible straps 20, such that the retention strap 24 may be in contact with the first plurality of flexible straps 20 when the seat 34 is in the design position I. In another example, it is contemplated that a retention strap 24 may be disposed below the first plurality of flexible straps 20 and may be attached to the downward-extending first and second panels 126, 128 (FIG. 10) of the frame 14, such that the retention strap 24 may be in contact with the first plurality of flexible straps 20 when the first plurality of flexible straps 20 may descend downward and may intrude into the vicinity of the retention strap 24 when the seat 34 is in the fully deployed position II.

Figure 1C:
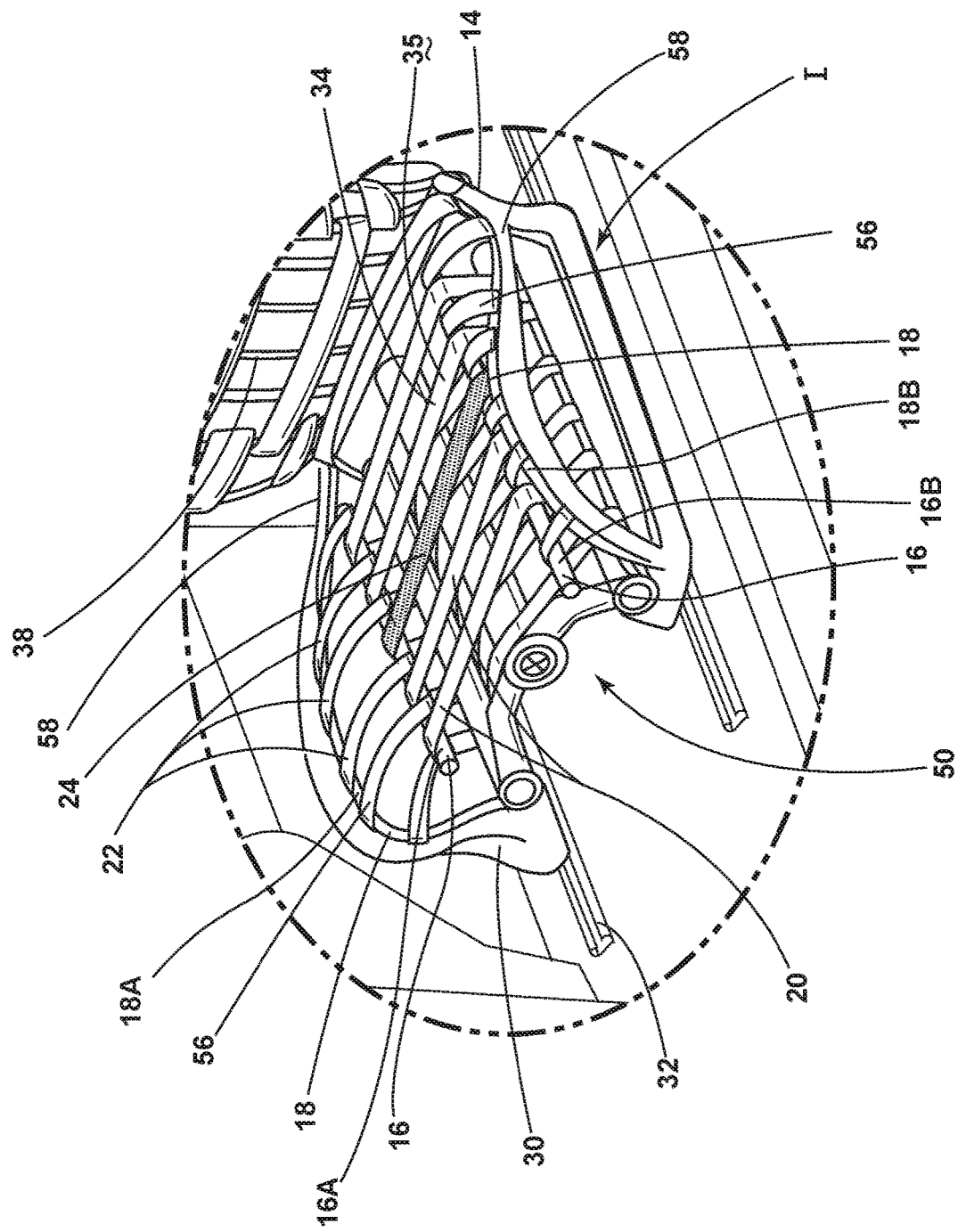
FIG. 1C is a top perspective view of a vehicle seating assembly of the present disclosure with a retention strap disposed among the straps and attached to the inner support member of the frame.
Figure 1D:
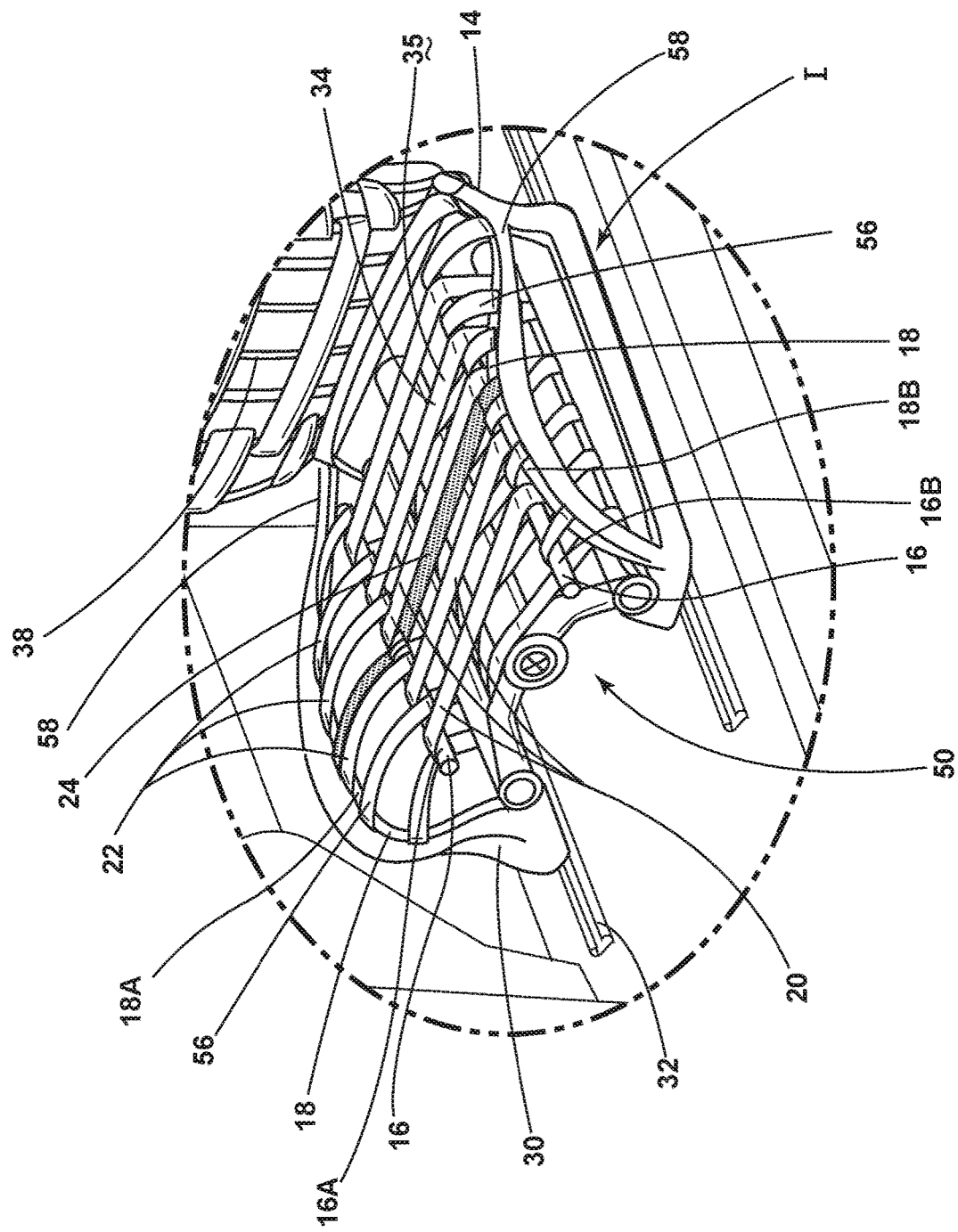
FIG. 1D is a top perspective view of a vehicle seating assembly of the present disclosure with a retention strap attached to the outer support member of the frame and slidably coupled to the inner support member of the frame.

With reference to FIG. 1C, an exploded view of the retention strap 24 disposed among the first plurality of flexible straps 20 and attached to the inner support member 16 of the frame 14 is shown. In the example shown in FIG. 1C, the retention strap 24 may be fixed to the first longitudinal member 16A and the second longitudinal member 16B of the inner support member 16 of the frame 14.

With reference to FIG. 1D, an exploded view of the retention strap 24 attached to the outer support member 18 of the frame 14 and slidably coupled to the inner support member 16 of the frame 14 is shown. The outer support member 18 may include a first longitudinal member 18A and a second longitudinal member 18B. In the example shown, the retention strap 24 may be fixed to the first longitudinal member 18A and the second longitudinal member 18B. In the example shown, the retention strap 24 may be slidably coupled to first longitudinal member 16A and the second longitudinal member 16B.

Figure 3:
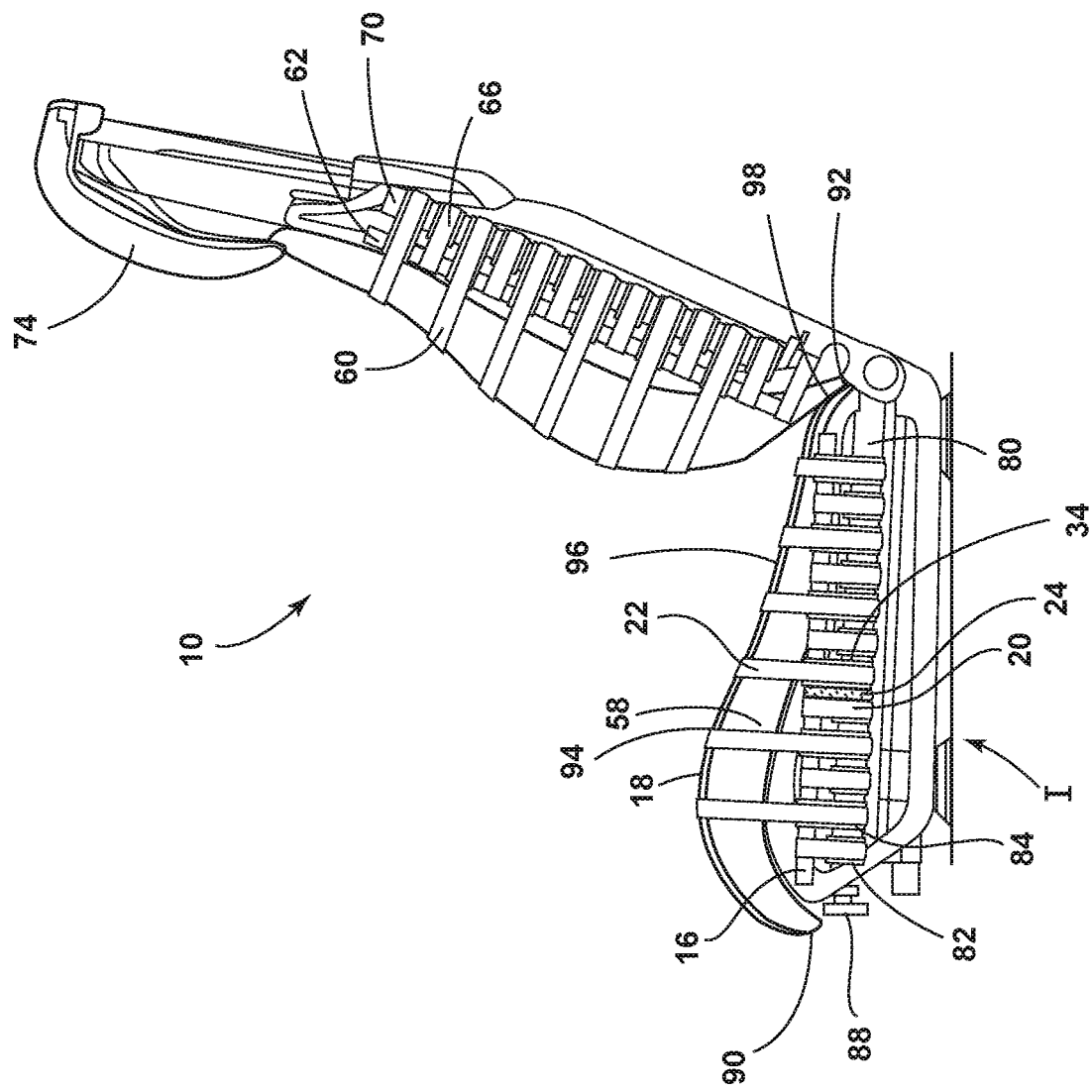
FIG. 3 is a side elevational view of a vehicle seating assembly of the present disclosure.

As illustrated in FIGS. 1-3, the first plurality of flexible straps 20 may extend across a middle portion of the seat 34 between the inner support members 16 of the frame 14. Thus, the first plurality of flexible straps 20 may directly control the firmness, and therefore, the comfort of a central portion of the seat 34. The second plurality of flexible straps 22 may extend across seat side bolsters 56, on each side of the seat 34 between one of the inner support member 16 and an adjacent outer support member 18. Accordingly, firmness and comfort of the seat side bolsters 56 may be controlled by the second plurality of flexible straps 22. The outer support member 18 may be covered by side support 58.

As shown in FIG. 3, the central area of the seatback 36 may include a third plurality of flexible straps 60 that extend between inner support members 62 of the seatback 36. The third plurality of flexible straps 60 may control the firmness of the seatback 36. Further, the seatback 36 of the seating assembly 10 may also include seatback side bolsters 66. The seatback side bolsters 66 may include a fourth plurality of flexible straps 68 that may extend between each inner support member 62 of the seatback 36 and an adjacent outer support member 70 of the seatback 36. It will be understood that the seatback 36 may be pivotable relative to the seat 34 or may be adjusted based on adjustments to the seat 34. In addition, the tension in the third and fourth plurality of flexible straps 60, 68 that extend across the seatback 36 may be adjusted independently of the seat 34. An upper portion 72 of the seatback 36 may include a headrest 74. The headrest 74 may include flexible straps or may include a separate foam construction. FIG. 3 shows the seat 34 and the retention strap 24 in the design position I.

With reference now to FIGS. 1-3, the inner and outer support members 16, 18 of the seating assembly 10 are illustrated. The inner support members 16 may be disposed at each side of the seat 34 inside the outer support members 18, which are disposed at outermost sides of the seat side bolsters 56. As illustrated, the tensioning apparatus 50 (FIG. 2) may be disposed below the seat 34 and supported by the frame 14. Rotation of the tensioning apparatus 50 may apply tension to, or removes tension from, the first and second plurality of flexible straps 20, 22.

Referring again to FIG. 3, the seat 34 may include a front edge 90 and a rear edge 92. The portion of the seat 34 between the retention strap 24 and a front edge 90 of the seat 34 may be referred to as a primary portion 94. The portion of the seat 34 between the retention strap 24 and the rear of the seat 34 may be referred to as a secondary portion 96. The secondary portion 96 may also refer to the area of the seat 34 between the retention strap 24 and the bite line 98. The bite line 98 may be the interface between the seat 34 and the seatback 36. As such, the retention member (retention strap 24) may be disposed between a primary portion 94 of the seat 34 and a secondary portion 96 of the seat 34.

Referring to FIGS. 1-3, it is contemplated that the first plurality of flexible straps 20 and the second plurality of flexible straps 22 may be examples of seat surface 35 configurations that may be disposed over the frame 14. The first plurality of flexible straps 20 and the second plurality of flexible straps 22 may be examples of substrates that may be disposed over the frame 14. Such substrates may include material shaped as straps, bands, continuous sheets, meshes, and other shapes and configurations. See, for example, the material configurations shown in FIGS. 10-12. The seat substrate may be made of various materials including polymers, cloth, leather, and other materials.

With continuous reference to FIGS. 1-3, a substrate may be disposed between the first and second longitudinal members 16A, 16B and/or 18A, 18B of the frame 14. In one example, the substrate may include a first plurality of flexible straps 20. In another example, the substrate may include a first plurality of flexible straps 20 and a second plurality of flexible straps 22. A first substrate may be disposed in the primary portion 94 of the seat. A second substrate may be disposed in a secondary portion 96 of the seat. The first substrate may be less flexible than the second substrate. A retention member may include a retention strap 24 that may be disposed between the first substrate and the second substrate. In some examples, the first substrate, the second substrate, and the retention strap 24 may be a continuous sheet.

Figure 4:
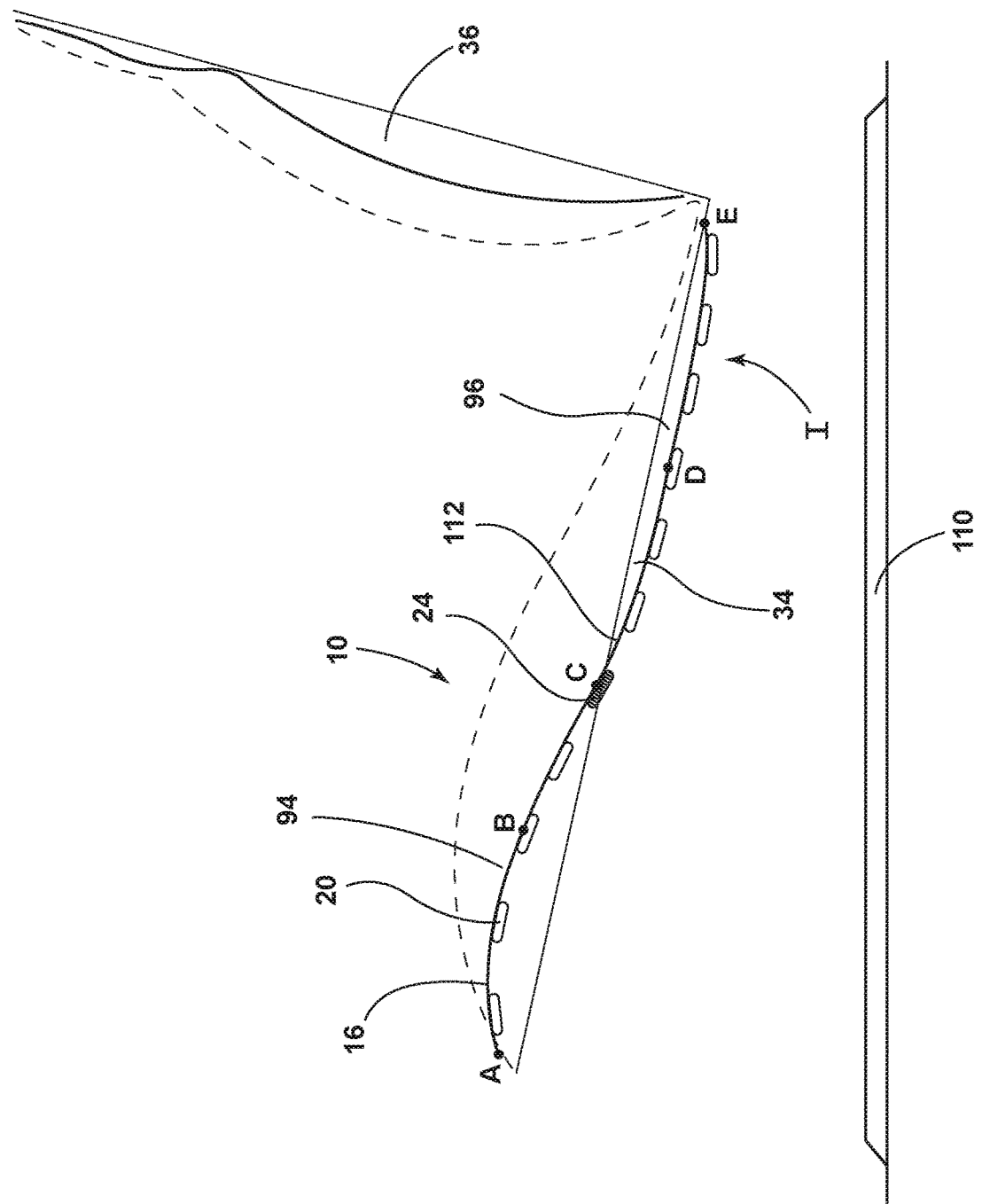
FIG. 4 is a side schematic view of an unoccupied vehicle seating assembly in a design position with a retention strap, according to an example.

Referring now to FIG. 4, the seating assembly 10 is shown in a design position. A schematic side view of an unoccupied seating assembly 10 is shown. The term design position I may be used to describe an unoccupied seating assembly 10 and an occupied seating assembly 10. The seating assembly 10 may include a seat 34 and a seatback 36. The seating assembly 10 may be disposed above a vehicle floor 110. The seating assembly 10 may include a first plurality of flexible straps 20 disposed across an inner support member 16 of the frame 14. Reference letters A, B, C, D, and E may define a curve 112 that the first plurality of flexible straps 20 is arranged along when the seating assembly 10 is unoccupied. The curve 112 may describe the shape of the primary portion 94 of the seat 34 and the secondary portion 96 of the seat 34. The curve 112 may have different shapes that correspond to an unoccupied seat 34 (for example, FIG. 4), an occupied seat 34 in a design position I (for example, FIGS. 5 and 7), and an occupied seat 34 in a fully deployed position II (for example, FIGS. 6 and 8).

Figure 5:
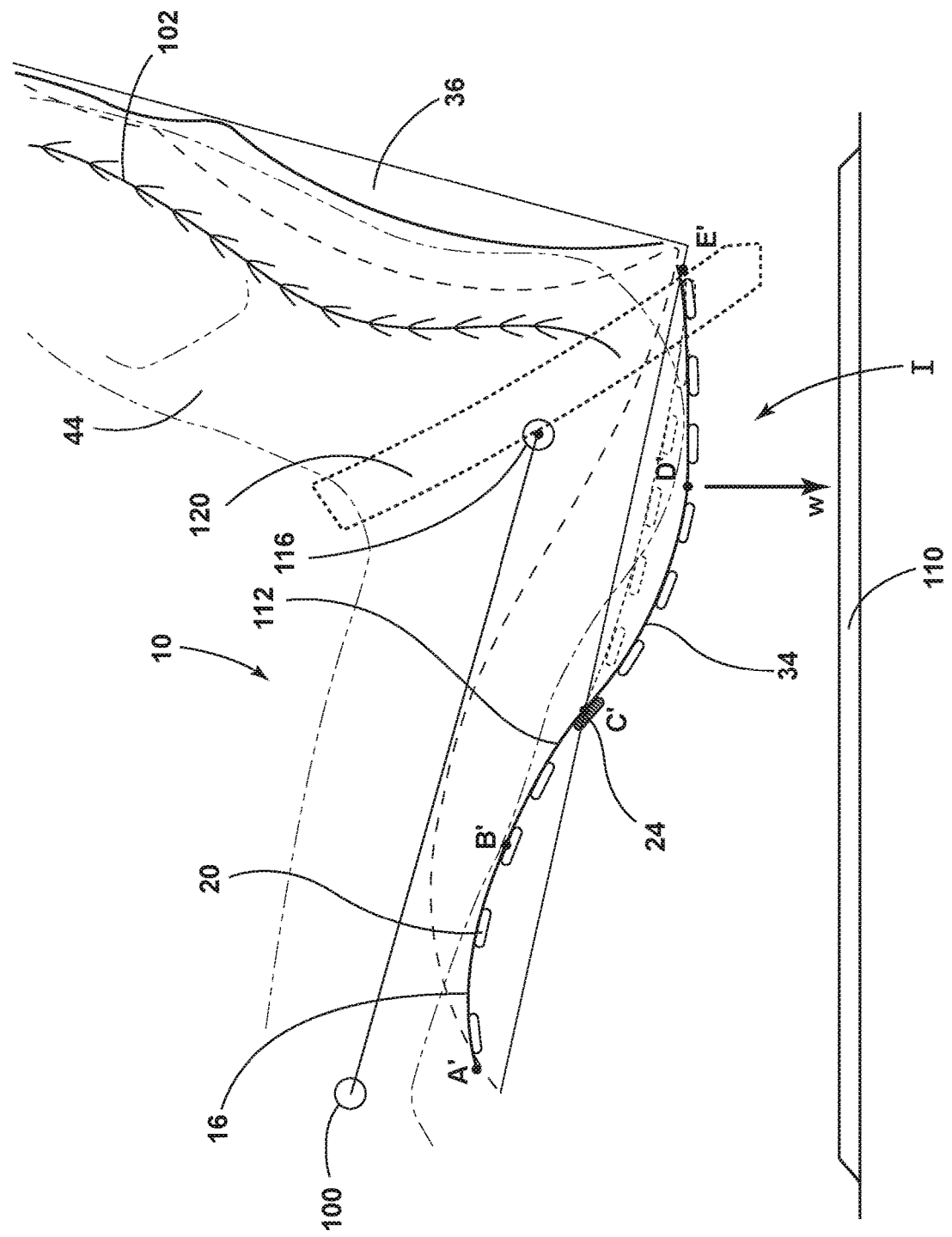
FIG. 5 is a side schematic view of an occupied vehicle seating assembly of FIG. 4 in a design position with a retention strap.

Referring to FIG. 5, a schematic side view of the occupied seating assembly 10 of FIG. 4 is shown. The seating assembly 10 may include a seat 34 and a seatback 36. An occupant 44 is shown disposed in the seating assembly 10. The spine 102 of the occupant 44 is shown disposed along the seatback 36. The H-point 116 of the occupant 44 is shown proximate the hips of the occupant 44. A knee 100 of the occupant 44 is also shown. A line 118 extends between the H-point 116 and the knee 100 of the occupant 44. A seat belt 120 is shown disposed over the occupant 44. Seat belt 120 may be a lap belt.

With continuing reference to FIG. 5, during a sudden deceleration of a vehicle (represented by F in FIGS. 6 and 8), it may be desirable to maintain the H-point 116 of a seated occupant 44. The H-point 116 of a seated occupant 44 may be set at a predetermined location relative to a vehicle seating assembly 10. When designing vehicle seating assemblies, design parameters may require that the H-point of a mannequin be aligned with the predetermined H-point for a particular vehicle seating assembly in a vehicle. The H-point may position the head of an occupant at an appropriate position relative to the headrest on the vehicle seating assembly and relative to the roof of the vehicle. The H-point may also position the hips of an occupant at an appropriate position relating to a seat belt or other restraint. Accordingly, the H-point 116 may be an important design parameter of vehicle seating assembly 10.

With continuing reference to FIG. 5, the seat 34 is shown in a design position I. The retention strap 24 is shown disposed among the first plurality of flexible straps 20. Reference letters A', B', C', D', and E' may define a curve 112 that the first plurality of flexible straps 20 are arranged along when an occupant 44 is seated in the seating assembly 10. The load exerted by the weight of the occupant 44 may be designated by an arrow designated w.

Figure 6:
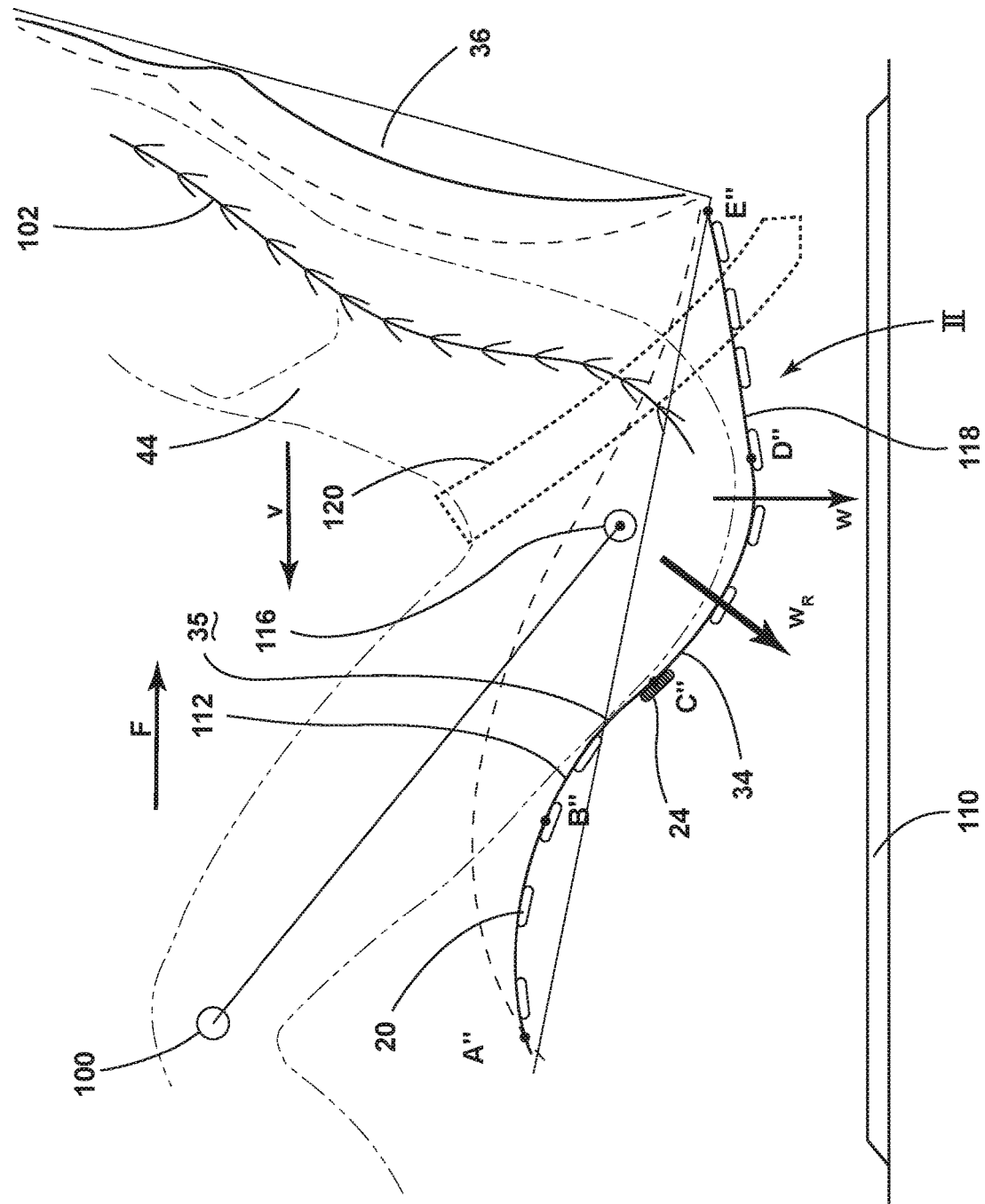
FIG. 6 is a side schematic view of an occupied vehicle seating assembly of FIG. 4 in a fully deployed position with a retention strap.
Figure 8:
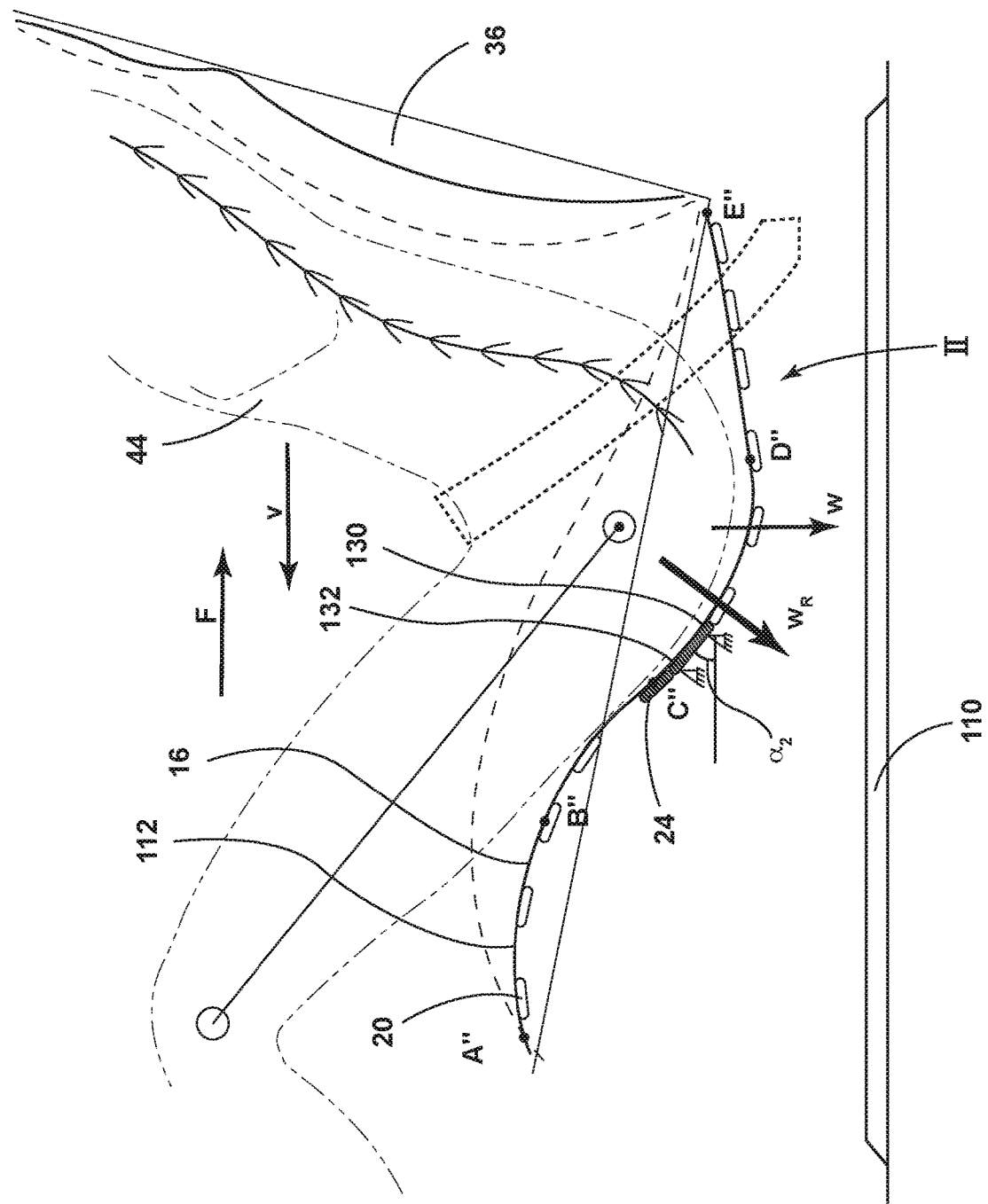
FIG. 8 is a side schematic view of an occupied vehicle seating assembly of FIG. 7 in a fully deployed position with a retention strap and a load limiter assembly.

Referring to FIG. 6, a schematic side view of the occupied seating assembly 10 after a sudden vehicle deceleration represented by arrow F in FIGS. 6 and 8 is shown. The seat 34 is shown in the fully deployed position II. Reference letters A", B", C", D", and E" may define a contour of the curve 112 that the first plurality of flexible straps 20 are arranged along after a sudden vehicle deceleration represented by arrow F in FIGS. 6 and 8. The load exerted by the weight of the occupant 44 may be designated by an arrow w. The load exerted by the weight of the occupant 44 (as restrained by seat belt 120) in response to the sudden deceleration of the vehicle 12 represented by arrow F in FIGS. 6 and 8 may be designated by arrow $W_R$. Load $W_R$ may move the occupant 44 into the retention strap 24. The retention strap 24 may restrain the occupant 44 (as restrained by seat belt 120) from moving forward along the seat surface 35. Arrow v may depict a velocity of the torso of the occupant in response to a sudden vehicle deceleration represented by arrow F in FIGS. 6 and 8.

Figure 7:
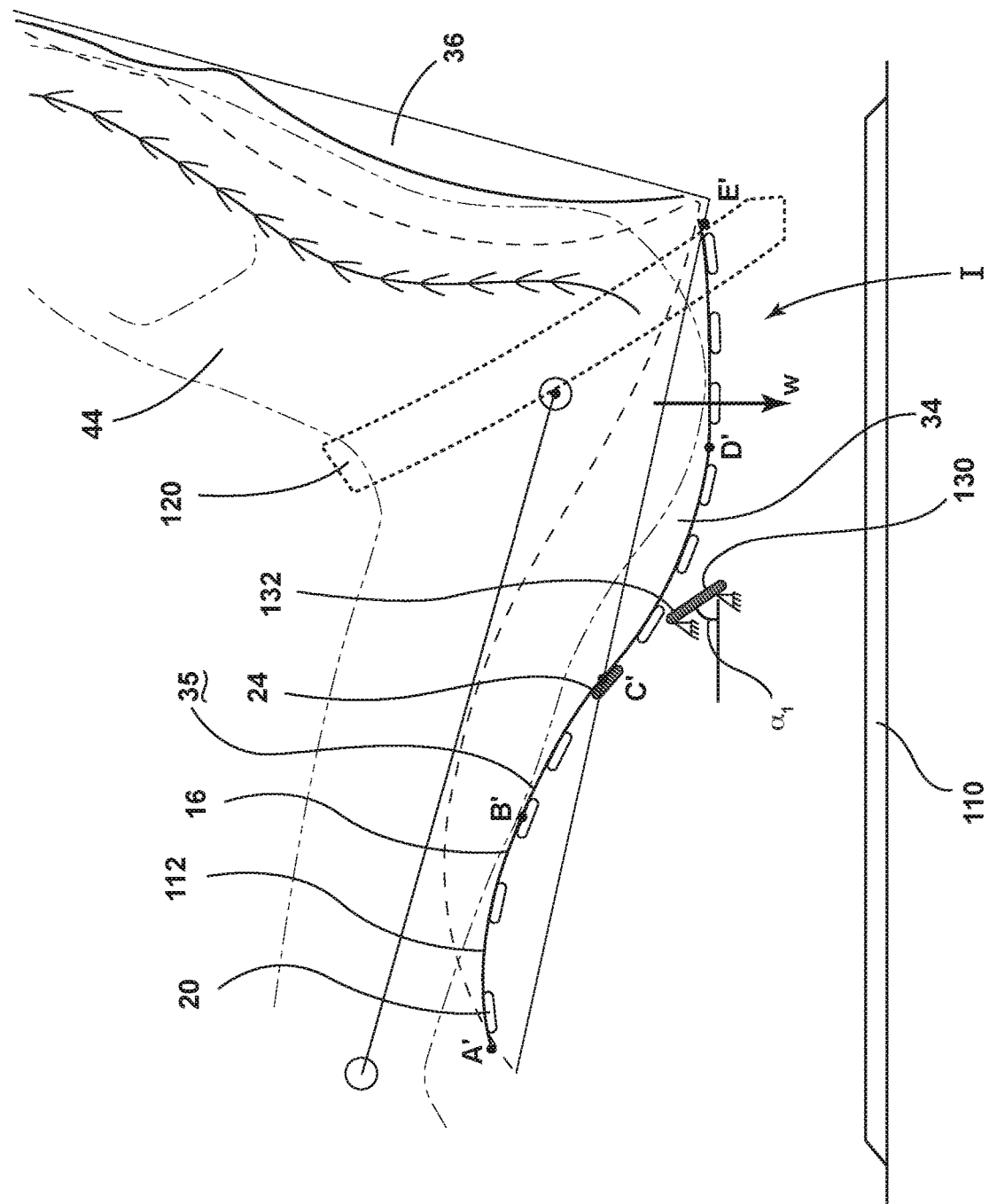
FIG. 7 is a side schematic view of an occupied vehicle seating assembly in a design position with a retention strap and a load limiter assembly, according to an example.

With reference to FIGS. 7 and 8, schematic side views of the seat 34 are shown in the design position I (FIG. 7) and the fully deployed position II (FIG. 8). An example of the seating assembly 10 is shown with a load limiter assembly 130 disposed under the first plurality of flexible straps 20. The load limiter assembly 130 may restrain the movement of the occupant 44 along the seat surface 35 during a sudden vehicle deceleration represented by arrow F in FIGS. 6 and 8. In one example, the load limiter assembly 130 may be used in addition to the retention strap 24. In the example shown in FIG. 7, the seat 34 is shown in the design position I. The retention member may be a retention strap 24. It is contemplated that the load limiter assembly 130 may also be used with a seat 34 that may not include a retention strap 24. The elongated member 132 of the load limiter assembly 130 is shown with the seat 34 in the occupied position in FIG. 7. The load limiter assembly 130 may include an elongated member 132 positioned at a first angle $\alpha_1$ when the seat 34 is in the design position I. The first angle $\alpha_1$ may be the angle between the elongated member 132 of the load limiter assembly 130 and the vehicle floor 110 or a line parallel to the vehicle floor 110.

With reference to FIG. 8, the elongated member 132 of the load limiter assembly 130 is shown when the seat 34 is in the fully deployed position II. The elongated member 132 of the load limiter assembly 130 may have a second angle $\alpha_2$ relative to a vehicle floor 110 or a line parallel to the vehicle floor 110. The second angle $\alpha_2$ may be greater than the first angle $\alpha_1$. As the seat 34 moves from the design position I (FIG. 7) to the fully deployed position II (FIG. 8) in response to a sudden vehicle deceleration represented by arrow F in FIGS. 6 and 8 and the weight of the occupant 44 (as restrained by seat belt 120), the resultant load $W_R$ may be exerted on the elongated member 132 of the load limiter assembly 130 and the retention strap 24. The first and second load limiters 146, 148 (see, FIG. 10) may absorb the load $W_R$ and may restrain the occupant 44 from moving forward along the seat surface 35. The flexibility of the first plurality of flexible straps 20 in the secondary portion 96 of the seat 34, in combination with the elongated member 132 of the load limiter assembly 130 and the retention strap 24, may allow the occupant 44 to descend into the secondary portion 96 of the seat 34 as the occupant 44 exerts the load $W_R$ on the seat 34.

Figure 9:
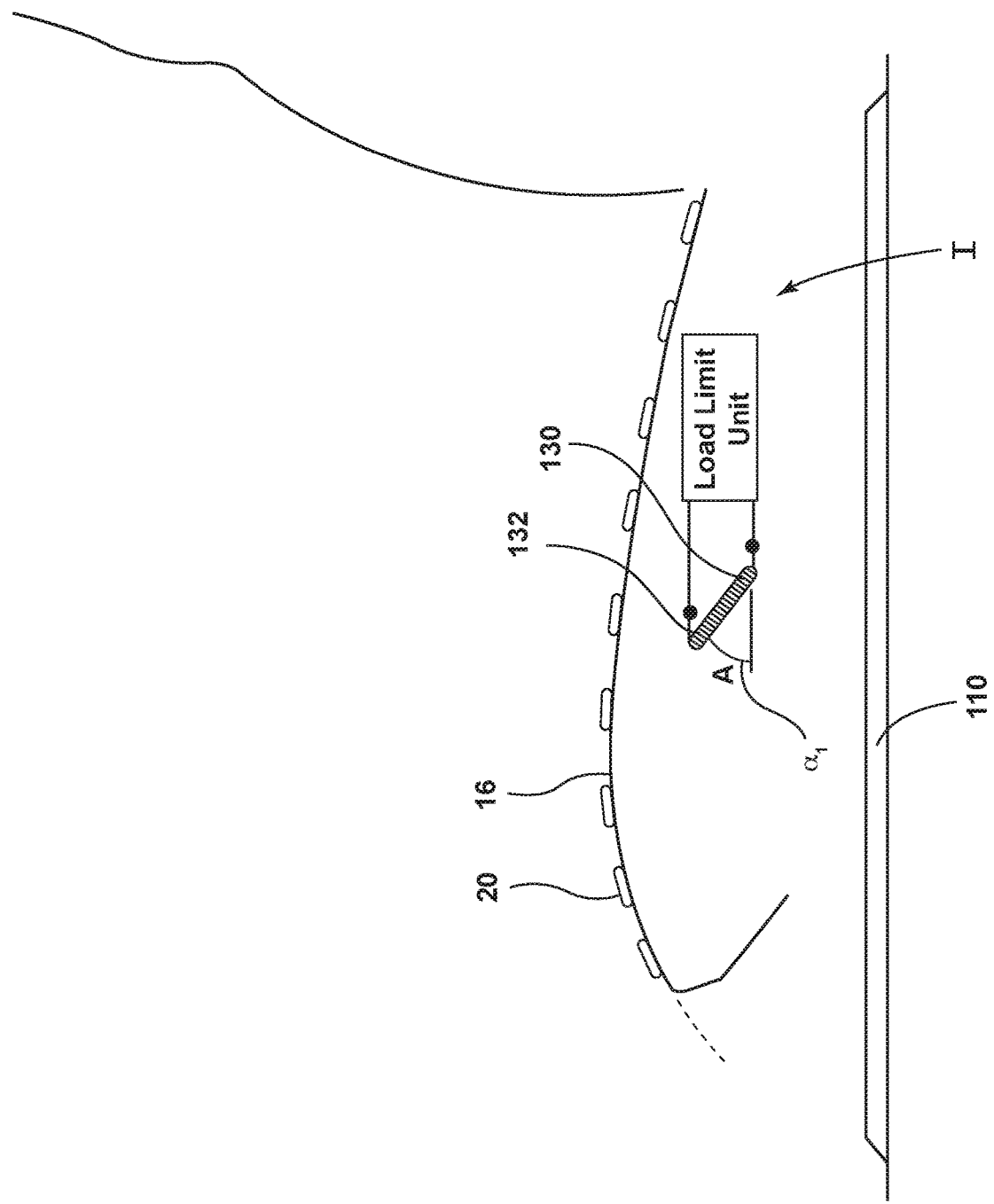
FIG. 9 is a side schematic view of an unoccupied seating assembly in a design position with a load limiter assembly.

With reference to FIG. 9, a side schematic view of the elongated member 132 of the load limiter assembly 130 disposed within the seat 34 is shown.

Figure 10:
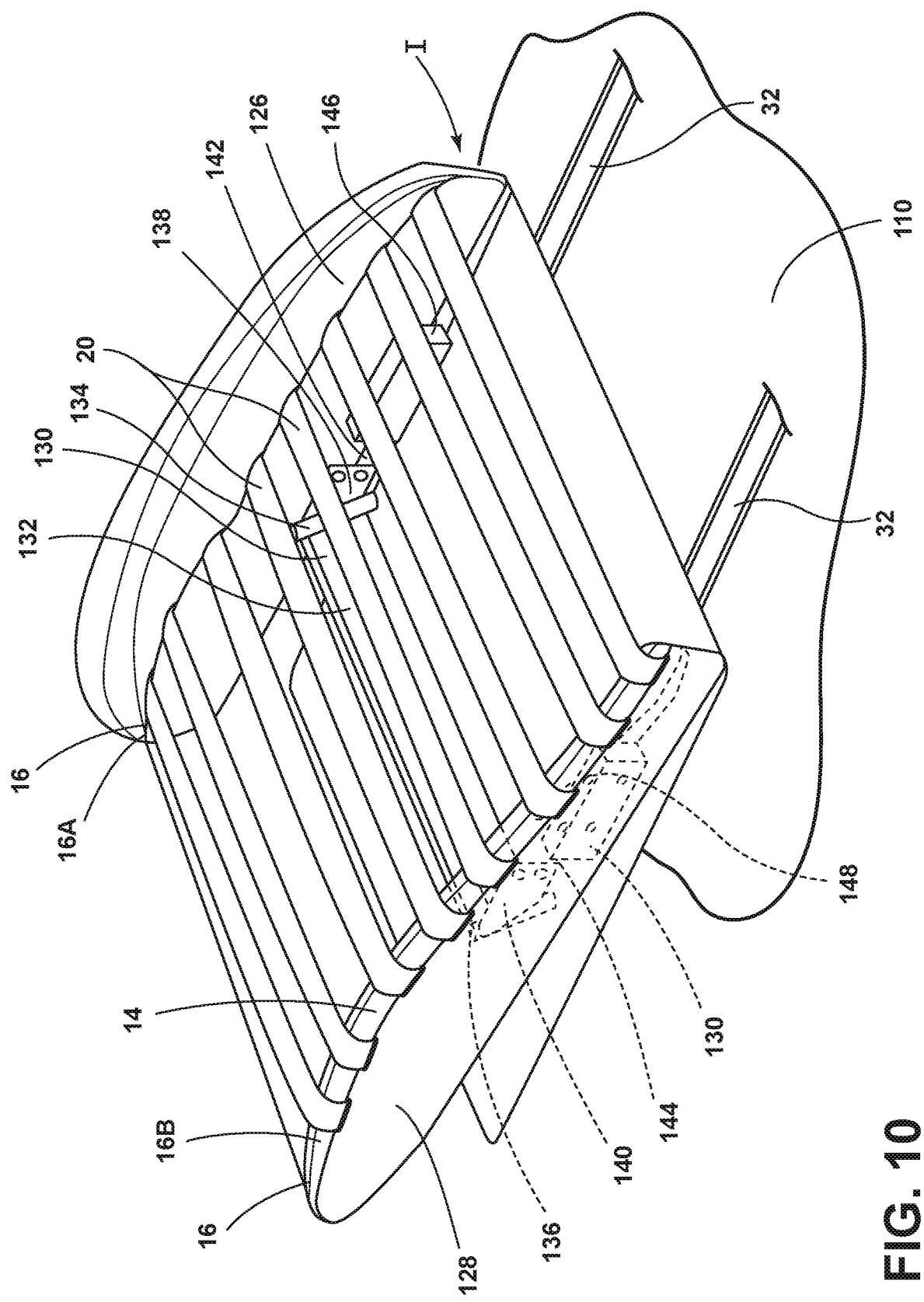
FIG. 10 is a side perspective view of a seat with a load limiter assembly in a design position, according to an example.

With reference to FIG. 10, the load limiter assembly 130 is shown attached to the frame 14 of the seat 34. The seat 34 is shown disposed on rail slides 32. The rail slides 32 may be mounted to a vehicle floor 110. FIG. 10 shows an example of a seat 34 with a first plurality of flexible straps 20 disposed transversely across first and second longitudinal members 16A, 16B of the frame 14. The first and second longitudinal members 16A, 16B of the frame 14 may include downward-extending first and second panels 126, 128. The load limiter assembly 130 may include an elongated member 132, first and second posts 134, 136 disposed on either end of the elongated member 132, first and second brackets 138, 140 for securing the elongated member 132 to the downward-extending first and second panels 126, 128, first and second connectors 142, 144, and first and second load limiters 146, 148. The first and second brackets 138, 140 may mount the first and second posts 134, 136 and the elongated member 132 to the downward-extending first and second panels 126, 128 of the frame 14. The first and second load limiters 146, 148 may be mounted to the downward-extending first and second panels 126, 128 of the frame 14. The first and second connectors 142, 144 may be disposed between the first and second load limiters 146, 148 and the elongated member 132. The elongated member 132 may be a high tension strap.

With continued reference to FIG. 10, the first and second load limiters 146, 148 may be resiliently biased to absorb a predetermined load (for example, load $W_R$) disposed on the elongated member 132. Thus, as a seated occupant 44 moves along the seat surface 35 in response to a sudden deceleration of the vehicle 12 represented by force F in FIGS. 6 and 8, the elongated member 132 may restrain the movement of the occupant 44. The placement of the elongated member 132 of the load limiter assembly 130 below the seat surface 35 may allow the elongated member 132 to be free from occupant loads in the design position I and may minimize interference of the elongated member 132 with the first plurality of flexible straps 20 in the design position I.

Figure 11:
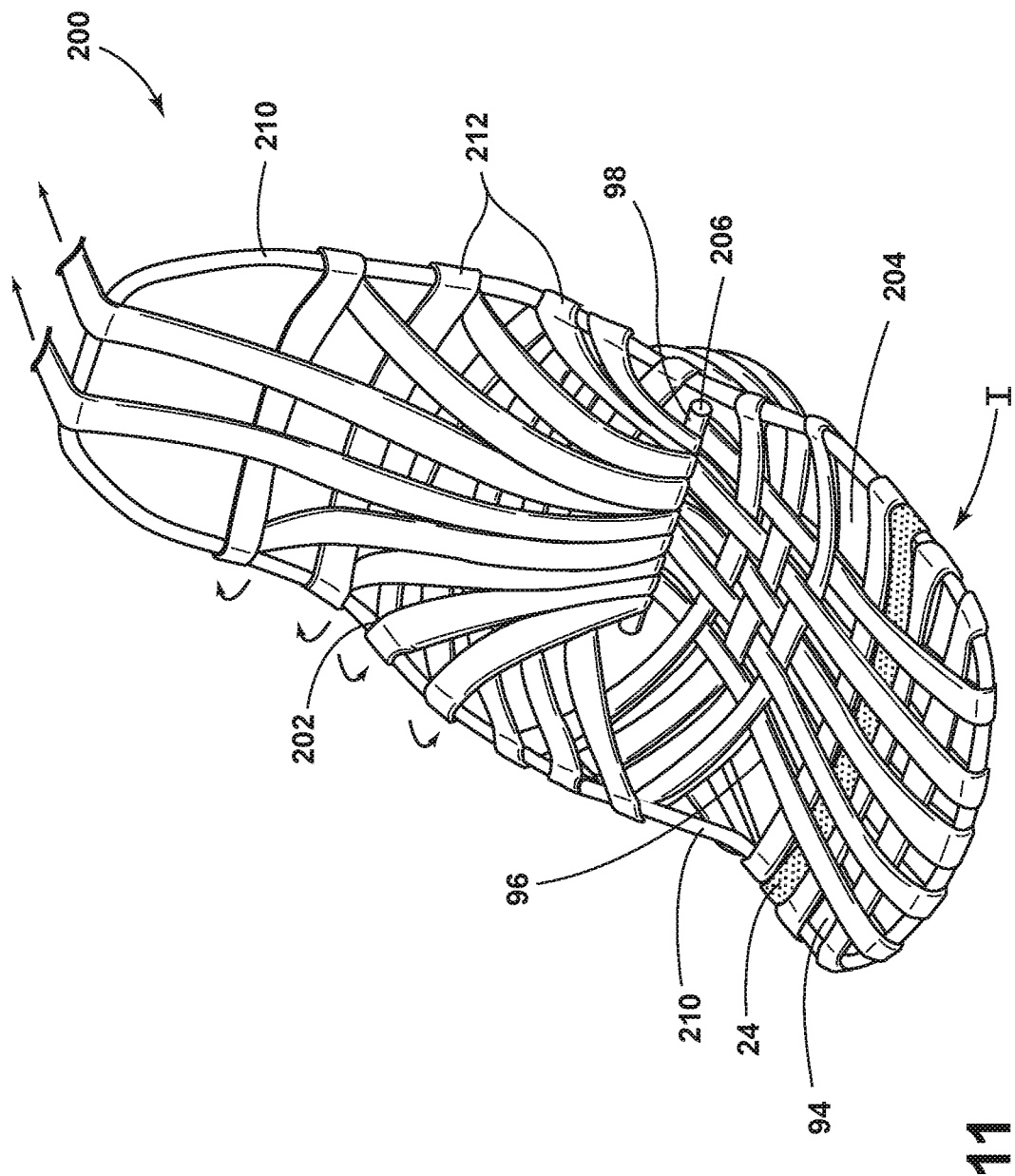
FIG. 11 is a top perspective view of another construction for a vehicle seating assembly of the present disclosure.

Referring to FIG. 11, in an alternative construction of a seating assembly 200, tension of the seatback 202 and the seat 204 may be applied by a rear lateral shaft 206 that is configured to rotate, thereby applying tension to a unitary peripheral frame member 210 of the seat 204 and seatback 202. As the rear lateral shaft 206 rotates, flexible straps 212 may rotate around the unitary peripheral frame member 210, thereby increasing or lessening the tension and rigidity of the seatback 202 and the seat 204. The flexible straps 212 may be configured to rotate around the unitary peripheral frame member 210 in different directions. It is also contemplated that different tightening mechanisms may be used and that the flexible straps 212 may stretch or may be substantially non-stretchable.

With continuing reference to FIG. 11, the retention strap 24 is shown disposed across the seat. The seat may include a primary portion 94 and a secondary portion 96. The seating assembly 200 may include a bite line 98. A load limiter assembly 130 may be used with the seating assembly 200.

Figure 12:
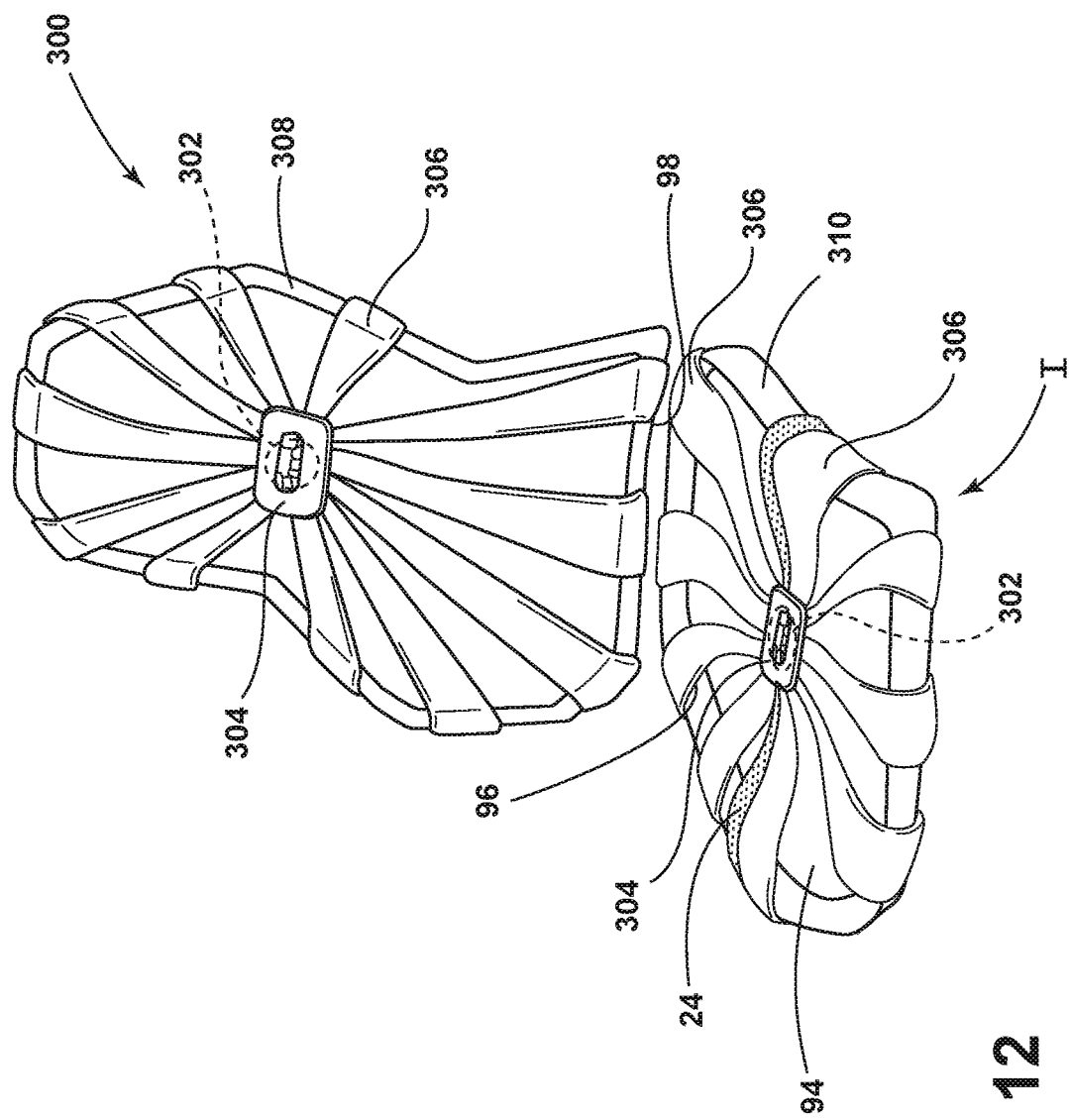
FIG. 12 is a top perspective view of another construction for a vehicle seating assembly of the present disclosure.

Referring to FIG. 12, in another construction of a seating assembly 300, a rotational member 302 may be disposed behind a central brace 304. The central brace 304 may be centrally located relative to a plurality of flexible straps 306. As the plurality of flexible straps 306 are pulled under tension by the rotational member 302 disposed behind the central brace 304, the plurality of flexible straps 306 may increase in tension, thereby stiffening a seatback 308 and/or seat 310. Any number of flexible straps may be used about the seat 310 or the seatback 308.

With continuing reference to FIG. 12, the retention strap 24 is shown disposed across the seat 310. The seat 310 may include a primary portion 94 and a secondary portion 96. The seating assembly 300 may include a bite line 98. A load limiter assembly 130 may be used with the seating assembly 300.

Figure 13:
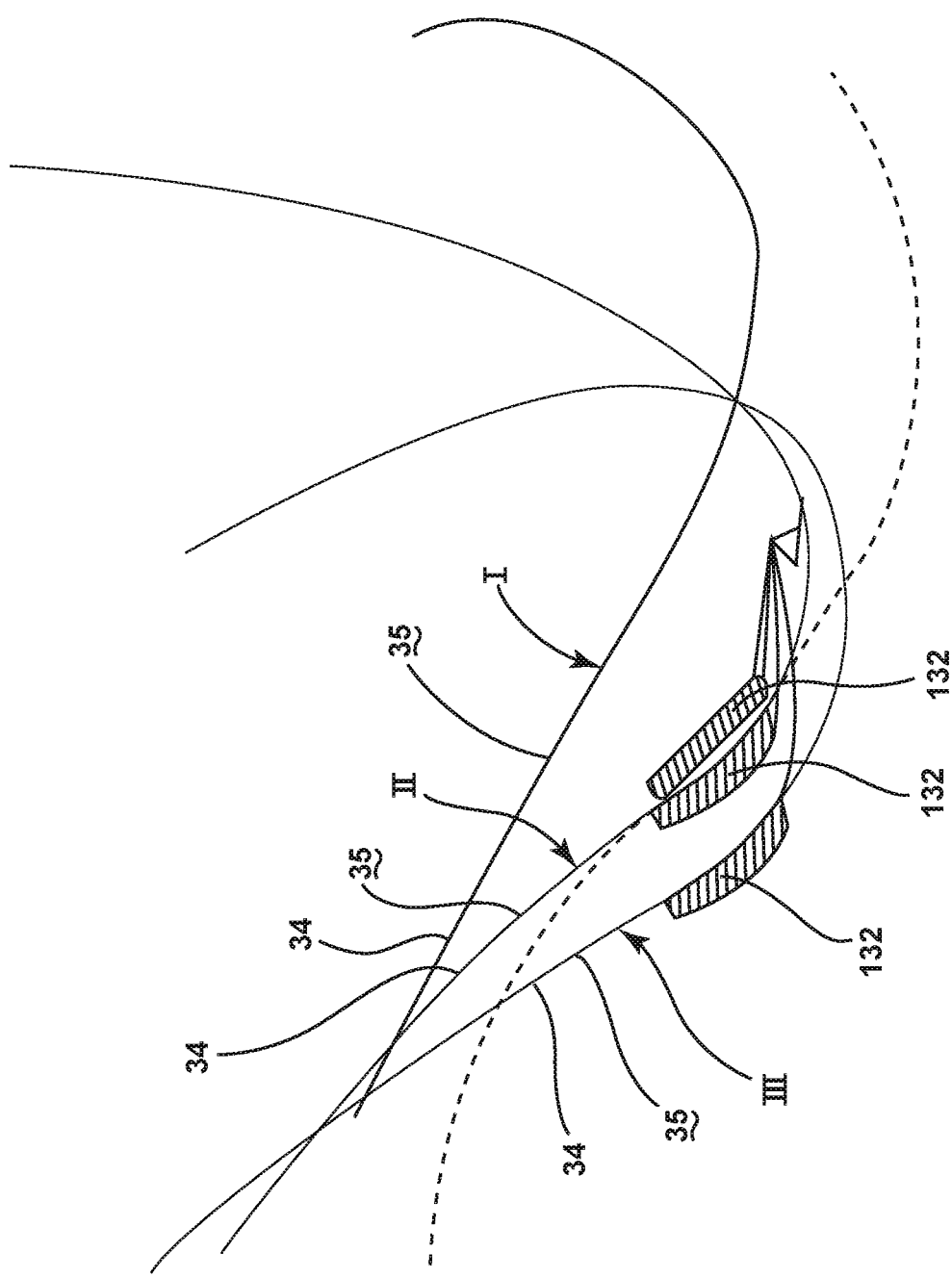
FIG. 13 is a schematic view of a load limiter assembly in a design position, a fully deployed position, and an overly deployed position.

Referring now to FIG. 13, a schematic view is shown of exemplary positions of the load limiter assembly 130. The elongated member 132 of the load limiter assembly 130 is shown in a design position I in which the seat surface 35 may not be engaged with the elongated member 132 of the load limiter assembly 130. The seat surface 35 is shown in a fully deployed position II. The fully deployed position II may refer to the position of the elongated member 132 of the load limiter assembly 130 upon a sudden deceleration of the vehicle represented by force F in FIGS. 6 and 8 and load $W_R$ responsive to force F. The seat 34 is also shown in an overly deployed position III. The overly deployed position III may correspond to a position where the $W_R$ may exceed the preset load limits of the load limiter assembly 130.

Figure 14:
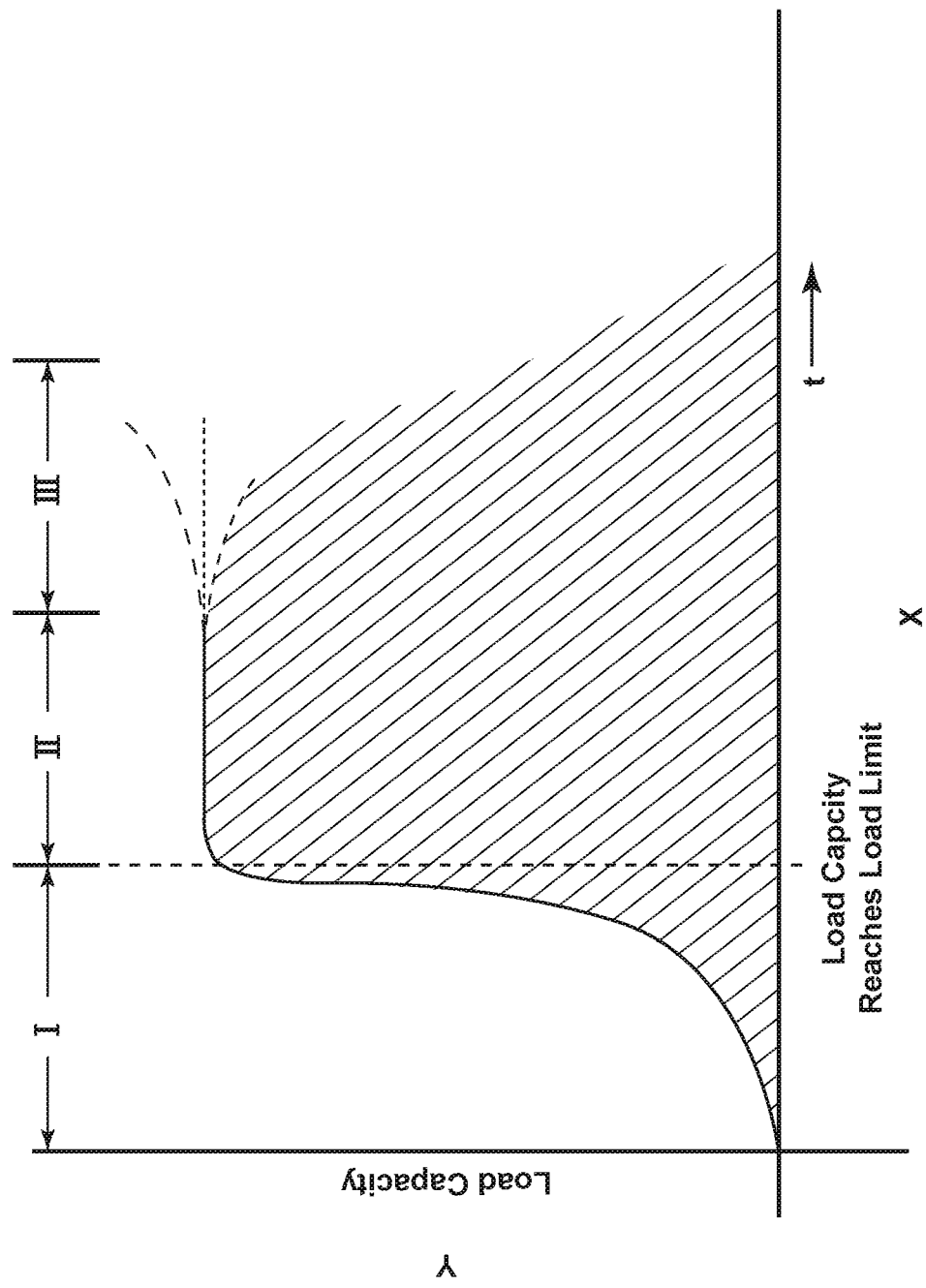
FIG. 14 is a graph showing an example of the load capacity of the load limiter assembly over time.

Referring to FIG. 14, a graph illustrates the load capacity of the load limiter assembly 130 over time. Time (t) is shown on the x-axis, and load capacity is shown on the y-axis. The design position I of the seat 34, the fully deployed position II of the seat 34, and the overly deployed position III of the seat 34 are also shown on the graph in FIG. 14.

The retention strap 24 and the elongated member 132 are shown in shadow in the previously described figures to distinguish the retention strap 24 and the elongated member 132 from other straps of the seat 34 for purposes of description of the retention strap 24 and the elongated member 132. It is contemplated that the retention strap 24 and the elongated member 132 may be similar or the same in appearance as the other straps of the seat 34 to provide an aesthetically pleasing appearance to the seat 34.

It is to be understood that the adjustment of the straps of the seat 34 by tensioning apparatus 50 (FIGS. 1-3), rear lateral shaft 206 (FIG. 11) and rotational member 302 (FIG. 12) may minimally or negligibly affect the properties of the primary portion 94 and the secondary portion 96 of the seat 34. That is, the seating assembly 10 may be designed so that adjustment of the tension in the straps with the tensioning apparatus 50 (FIGS. 1-3), rear lateral shaft 206 (FIG. 11), and rotational member 302 (FIG. 12) may minimally or negligibly affect characteristics of primary portion 94 of the seat 34 relative to the secondary portion 96 of the seat 34. For example, the straps in the primary portion 94 of the seat 34 may be less flexible, stiffer, and less elastic than the straps in the secondary portion 96 of the seat 34 even when the tensioning apparatus 50 (FIGS. 1-3), rear lateral shaft 206 (FIG. 11) and rotational member 302 (FIG. 12) are used to adjust the tension of the straps.

It is to be understood that the placement of the retention strap 24 and/or the elongated member 132 of the load limiter assembly 130 may be made relative to the predicted location of the H-point 116 of an occupant 44 during a sudden vehicle deceleration represented by arrow F in FIGS. 6 and 8. That is, the retention strap 24 and/or the elongated member 132 of the load limiter assembly 130 may be positioned to limit the movement of the occupant 44 along a seat surface 35 during a sudden vehicle deceleration represented by arrow F in FIGS. 6 and 8.

A variety of advantages may be derived from the present disclosure. The seating assembly may be lightweight. The seating assembly may utilize various substrates. The seating assembly may utilize straps having various weave patterns. The seating assembly may be aesthetically pleasing. The retention strap 24 may be aesthetically appealing. The retention member may be integrated with the seating assembly.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A foamless vehicle seating assembly, comprising:
   a frame including an inner support member and an outer support member;
   a first plurality of flexible straps extending about the inner support member of the frame;
   a second plurality of flexible straps extending about the outer support member of the frame, wherein at least one strap of the second plurality of flexible straps of the outer support member is adjacent to at least one strap of the first plurality of flexible straps of the inner support member; and
   a retention member disposed transverse to the inner support member of the frame disposed in a seat, wherein the retention member is movably coupled to the inner support member and is displaceable from an initial position to a fully deployed position in response to a sudden vehicle deceleration.

2. The foamless vehicle seating assembly of claim 1, wherein the retention member is disposed between a primary portion of the seat and a secondary portion of the seat.

3. The foamless vehicle seating assembly of claim 2, wherein the primary portion of the seat is disposed between the retention member and a front edge of the seat.

4. The foamless vehicle seating assembly of claim 3, wherein the secondary portion of the seat is disposed between the retention member and a bite line.

5. The foamless vehicle seating assembly of claim 4, wherein the first plurality of flexible straps in the primary portion of the seat are less flexible than the first plurality of flexible straps in the secondary portion of the seat.

6. The foamless vehicle seating assembly of claim 5, wherein the inner support member is disposed at each side of a seat and the outer support member is disposed at outermost sides of seat side bolsters.

7. The foamless vehicle seating assembly of claim 6, wherein the retention member includes a retention strap fixed to the inner support member disposed at each side of the seat.

8. The foamless vehicle seating assembly of claim 6, wherein the retention member includes a retention strap fixed to the outer support member disposed at outermost sides of seat side bolsters.

9. The foamless vehicle seating assembly of claim 8, wherein the retention strap is slidably coupled to the inner support member disposed at each side of the seat.

10. The foamless vehicle seating assembly of claim 4, wherein the first plurality of flexible straps in the primary portion of the seat are less elastic than the first plurality of flexible straps in the secondary portion of the seat.

11. The foamless vehicle seating assembly of claim 4, wherein the first plurality of flexible straps in the primary portion of the seat are stiffer than the first plurality of flexible straps in the secondary portion the seat.

12. The foamless vehicle seating assembly of claim 4, wherein the retention member includes a retention strap disposed above the first plurality of flexible straps.

13. The foamless vehicle seating assembly of claim 4, wherein the retention member includes a retention strap disposed below the first plurality of flexible straps.

14. The foamless vehicle seating assembly of claim 13, wherein the retention member includes an elongated member of a load limiter assembly.

15. A vehicle seating assembly comprising:
    a seat including:
        a frame having:
            first and second longitudinal members; and
            a retention member disposed between the first and second longitudinal members and movably coupled to an inner support member of the frame; wherein the retention member is movable from an initial position to a fully deployed position in response to a sudden vehicle deceleration; and
        a substrate disposed between the first and second longitudinal members of the frame and including:
            a first portion disposed between the retention member and a front edge of the seat; and
            a second portion disposed between the retention member and a rear edge of the seat; wherein the first portion is less flexible than the second portion.

16. The vehicle seating assembly of claim 15, wherein the retention member includes a retention strap fixed to the first and second longitudinal members of the frame.

17. The vehicle seating assembly of claim 15, wherein the retention member further comprises a load limiter assembly, the load limiter assembly including an elongated member, wherein the load limiter assembly is coupled to the frame.

18. The vehicle seating assembly of claim 17, wherein in the initial position of the retention member, the elongated member is disposed at a first angle relative to a vehicle floor, and wherein in the fully deployed position of the retention member, the elongated member is disposed at a second angle relative to the vehicle floor.

19. The vehicle seating assembly of claim 15, wherein the retention member includes a retention strap fixed to the first and second longitudinal members of the frame, and wherein the retention member includes an elongated member of a load limiter assembly coupled to the frame.

20. A vehicle seating assembly, comprising:
    a seat including:
        a frame having:
            first and second longitudinal frame members; and
            a retention member disposed transverse to the first and second longitudinal frame members; the retention member movably coupled with respect to the first and second longitudinal frame members; wherein the retention member is movable from an initial position to a fully deployed position in response to a sudden vehicle deceleration; and
    a substrate disposed over the frame and having:
    a primary portion; and
    a secondary portion, wherein the secondary portion extends between the retention member and a bite line of the seating assembly, and wherein the secondary portion deforms from a first shape to a second shape in response to a sudden vehicle deceleration.

\* \* \* \* \*